United States Patent
Wang et al.

(10) Patent No.: US 11,686,993 B2
(45) Date of Patent: Jun. 27, 2023

(54) LIQUID CRYSTAL PHASE SHIFTER ARRAY, DRIVING METHOD THEREOF, AND LASER SCANNER

(71) Applicant: BEIJING SMART-AERO DISPLAY TECHNOLOGY CO., LTD., Beijing (CN)

(72) Inventors: Jingming Wang, Beijing (CN); Huizhong Zhu, Beijing (CN)

(73) Assignee: BEIJING SMART-AERO DISPLAY TECHNOLOGY CO., LTD., Beijing (CN)

( * ) Notice: Subject to any disclaimer, the term of this patent is extended or adjusted under 35 U.S.C. 154(b) by 1199 days.

(21) Appl. No.: 16/249,157

(22) Filed: Jan. 16, 2019

(65) Prior Publication Data

US 2019/0285965 A1    Sep. 19, 2019

(30) Foreign Application Priority Data

Mar. 15, 2018    (CN) .......................... 201820353485.6

(51) Int. Cl.
  *G02F 1/295*    (2006.01)
  *G01S 7/481*    (2006.01)
  *G02F 1/13*    (2006.01)

(52) U.S. Cl.
  CPC .......... *G02F 1/2955* (2013.01); *G01S 7/4817* (2013.01); *G02F 1/1326* (2013.01); *G02F 2203/50* (2013.01)

(58) Field of Classification Search
  CPC .. G02F 1/2955; G02F 1/1326; G02F 2203/50; G01S 7/4817
  See application file for complete search history.

(56) References Cited

U.S. PATENT DOCUMENTS

| | | | |
|---|---|---|---|
| 5,557,692 A * | 9/1996 | Pan ....................... | G02F 1/1326 385/11 |
| 5,659,332 A * | 8/1997 | Ishii ................... | G02F 1/136277 345/182 |
| 2016/0154291 A1* | 6/2016 | Gibson .................... | G02F 1/139 349/33 |
| 2018/0364505 A1* | 12/2018 | Tan ....................... | G02F 1/1343 |
| 2019/0204423 A1* | 7/2019 | O'Keeffe ................ | G01S 17/89 |

* cited by examiner

*Primary Examiner* — Donald L Raleigh
(74) *Attorney, Agent, or Firm* — Kinney & Lange, P.A.

(57) ABSTRACT

The present disclosure provides a liquid crystal phase shifter array, a driving method thereof, and a laser scanner. The liquid crystal phase shifter array includes a plurality of liquid crystal phase shifter units arranged in array, a first substrate and a second substrate disposed opposite to each other, a liquid crystal layer provided between the first substrate and the second substrate, a first electrode provided on the first substrate, and a second electrode provided on the second substrate. Each liquid crystal phase shifter unit includes a first optical waveguide provided on a side of the first substrate proximal to the liquid crystal layer and arranged to be in direct contact with the liquid crystal layer.

16 Claims, 3 Drawing Sheets

LIQUID CRYSTAL PHASE SHIFTER ARRAY, DRIVING METHOD THEREOF, AND LASER SCANNER

CROSS-REFERENCE TO RELATED APPLICATIONS

The present application claims the priority of Chinese Patent Application No. 201820353485.6, filed on Mar. 15, 2018 and entitled "liquid crystal phase shifter array and laser scanner", the contents of which are incorporated herein in their entirety by reference.

TECHNICAL FIELD

The present disclosure relates to the technical field of liquid crystal display equipment, and particularly relates to a liquid crystal phase shifter array, a driving method thereof, and a laser scanner.

BACKGROUND

In general, a laser scanner has an internal structure that a rotating motor with high stability and precision is usually adopted to drive a multifaceted prism to rotate, a laser beam strikes the multifaceted prism and is reflected to form a laser scanning beam, and an outgoing direction of the laser beam is adjusted by adjusting an angle of the multifaceted prism, so as to direct the laser beam onto an object to be scanned to achieve laser scanning.

However, as a mechanical structure, the rotating motor will start to wear as a service time thereof increases, which will affect control of a rotation angle of the multifaceted prism and further lead to decrease in scanning accuracy. Moreover, laser scanners in related prior art have disadvantages of large number of components, complex structure and high production cost.

SUMMARY

In view of the aforesaid disadvantages in related prior art, the present disclosure provides a liquid crystal phase shifter array, a driving method thereof, and a laser scanner, so as to partially solve the problems of decrease in scanning accuracy due to loss of the rotating motor, and complex structure and high production cost of the laser scanners.

One aspect of the present disclosure provides a liquid crystal phase shifter array, including a plurality of liquid crystal phase shifter units arranged in array; a first substrate and a second substrate disposed opposite to each other; a liquid crystal layer provided between the first substrate and the second substrate; a, first electrode provided on a side of the first substrate proximal to the liquid crystal layer; and a second electrode provided on a, side of the second substrate proximal to the liquid crystal layer. Each of the plurality of liquid crystal phase shifter units includes a first optical waveguide provided on the side of the first substrate proximal to the liquid crystal layer and arranged to be in direct contact with the liquid crystal layer.

According to embodiments of the present disclosure, the first optical waveguide may include a first base, and a first waveguide tube provided on a side of the first base proximal to the liquid crystal layer. The first waveguide tube has a refractive index $n1$, and the first base has a refractive index $n2$.

According to the embodiments of the present disclosure, the liquid crystal phase shifter array may further include a second optical waveguide provided on the side of the first substrate proximal to the liquid crystal layer, and coupled to the first optical waveguide of an adjacent liquid crystal phase shifter unit.

According to the embodiments of the present disclosure, the second optical waveguide may include a second base, a second waveguide tube and a shielding film. The second waveguide tube is provided on a side of the second base proximal to the liquid crystal layer, and is communicated with the first waveguide tube of the first optical waveguide coupled to the second optical waveguide. The shielding film is provided on a side of the second waveguide tube proximal to the liquid crystal layer, and covers at least the second waveguide tube. The second waveguide tube has a refractive index $n4$, the shielding film has a refractive index $n5$, the second base has a refractive index $n6$, and it is satisfied that $n5<n4$ and $n6<n4$.

According to the embodiments of the present disclosure, $n4$ may be equal to $n1$, and $n6$ may be equal to $n2$.

According to the embodiments of the present disclosure, the first waveguide tube and the second waveguide tube may include quartz, and/or the first base and the second base may include silicone.

According to the embodiments of the present disclosure, the first electrode and the second electrode may be stripe-shaped electrodes, and may be arranged in directions perpendicular to each other.

According to the embodiments of the present disclosure, the liquid crystal phase shifter array may further include spacers provided between the first substrate and the second substrate.

According to the embodiments of the present disclosure, the liquid crystal phase shifter array may further include sealant provided at peripheral regions thereof and configured to seal a space between the first substrate and the second substrate.

According to the embodiments of the present disclosure, the liquid crystal phase shifter array may further include a first alignment layer conformally formed on an upper surface and side surfaces of the first electrode and an upper surface of the first substrate, and a second alignment layer conformally formed on a lower surface and side surfaces of the second electrode and a lower surface of the second substrate.

According to the embodiments of the present disclosure, the liquid crystal phase shifter array may further include a directional coupler provided on the first substrate and configured to split a laser incident on the directional coupler into a plurality of laser beams, and make each laser beam to be incident on the first optical waveguide of each liquid crystal phase shifter unit arranged corresponding to the directional coupler.

Another aspect of the present disclosure provides a laser scanner including a scanning head. The scanning head includes the liquid crystal phase shifter array according to the present disclosure; and a laser emitter for emitting a first laser. The liquid crystal phase shifter array is configured to receive the first laser emitted from the laser emitter, and make the first laser to transmit through first optical waveguides of respective liquid crystal phase shifter units and interfere with each other, so as to change a direction of the first laser and enable the first laser to be incident on an object to be scanned. The liquid crystal phase shifter array is configured to further receive a second laser reflected back from the object to be scanned, make the second laser to transmit through the first optical waveguides of the respective liquid crystal phase shifter units and interfere with each other, so as to change a direction of the second laser. The first laser is reflected by the object to be scanned to form the second laser which carries information of the object to be scanned.

According to the embodiments of the present disclosure, the laser scanner may further include a control module, and the scanning head may further include a, data receiver. The data receiver is configured to receive the second laser which exits from the liquid crystal phase shifter array, and the control module is configured to supply voltages to the first electrode and the second electrode of the liquid crystal phase shifter array, and determine an image of the object to be scanned according to the information carried by the second laser received by the data receiver.

According to the embodiments of the present disclosure, the scanning head may further include an optical path changer provided between the laser emitter and the liquid crystal phase shifter array and between the liquid crystal phase shifter array and the data receiver, and configured to receive the first laser emitted from the laser emitter and change the direction of the first laser so as to make the first laser to be incident on the liquid crystal phase shifter array, and receive the second laser which exits from the liquid crystal phase shifter array and change the direction of the second laser so as to make the second laser to be incident on the data receiver.

According to the embodiments of the present disclosure, the laser scanner may further include a distance measuring module configured to calculate a distance between the object to be scanned and the laser scanner according to a phase and emission time of the first laser emitted by the laser emitter and a phase and receiving time of the second laser received by the data receiver.

Another aspect of the present disclosure provides a driving method of a liquid crystal phase shifter array, the liquid crystal phase shifter array including a plurality of liquid crystal phase shifter units arranged in array; a first substrate and a second substrate disposed opposite to each other; a liquid crystal layer provided between the first substrate and the second substrate; a first electrode provided on a side of the first substrate proximal to the liquid crystal layer; and a second electrode provided on a side of the second substrate proximal to the liquid crystal layer, wherein each of the plurality of liquid crystal phase shifter units includes a first optical waveguide provided on the side of the first substrate proximal to the liquid crystal layer and arranged to be in direct contact with the liquid crystal layer. The driving method includes applying different voltages on the first electrode and the second electrode, so as to make a laser incident on the first optical waveguide to exit into the liquid crystal layer.

According to embodiments of the present disclosure, the first optical waveguide may include a, first base, and a first waveguide tube provided on a side of the first base proximal to the liquid crystal layer. The first waveguide tube has a refractive index n1, the first base has a refractive index n2, and the liquid crystal layer has a refractive index n3. The driving method includes applying different voltages on the first electrode and the second electrode, so as to satisfy n2<n1<n3.

DETAILED DESCRIPTION

In order to enable those skilled in the art to better understand the technical solutions of the present disclosure, the present disclosure will be further described in detail below with reference to the accompanying drawings and embodiments.

Figure 1:
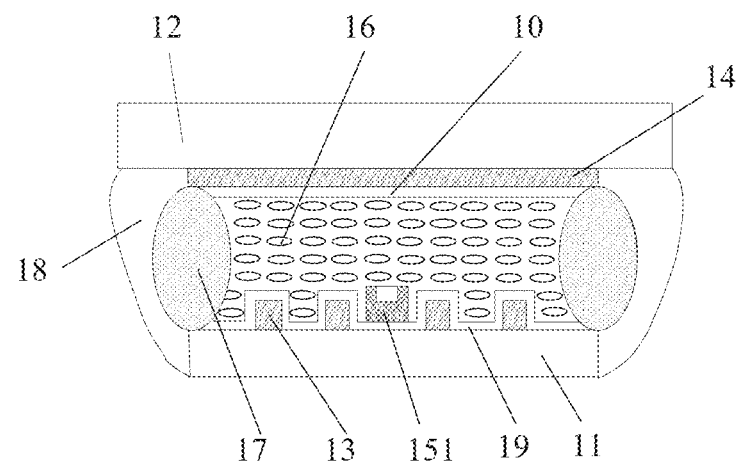
FIG. 1 is a main view of a liquid crystal phase shifter according to embodiments of the present disclosure.
Figure 2:
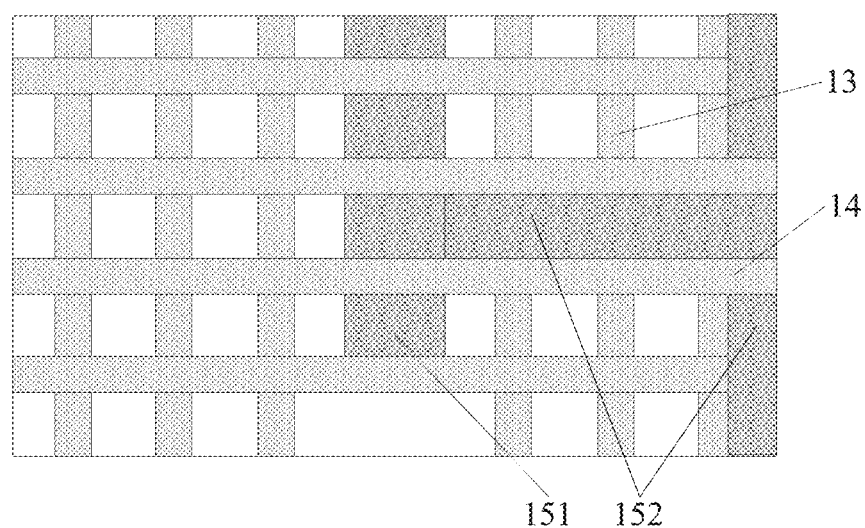
FIG. 2 is a schematic diagram of distribution of first optical waveguides, second optical waveguides, first electrodes and second electrodes according to embodiments of the present disclosure.
Figure 3:
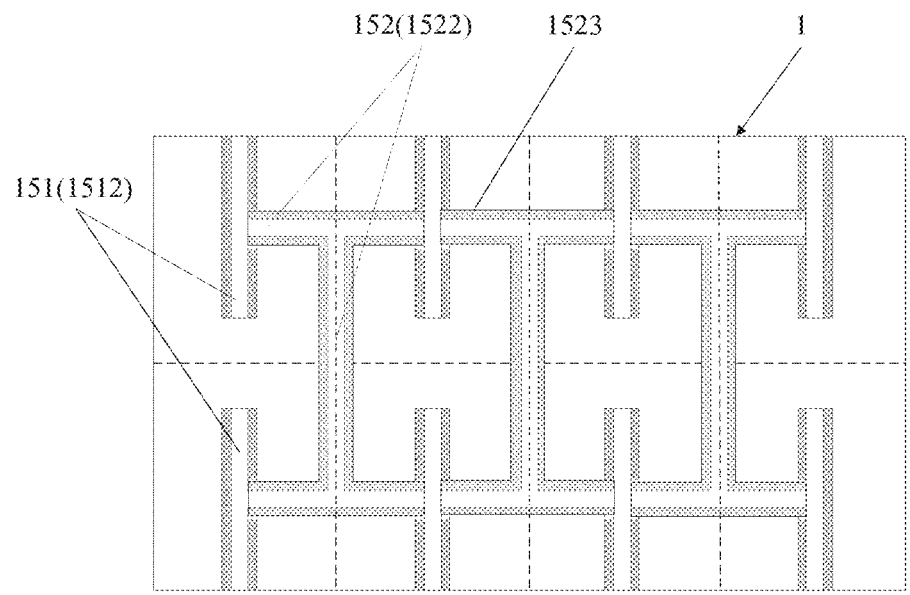
FIG. 3 is a top view of a liquid crystal phase shifter array according to embodiments of the present disclosure.
Figure 5:
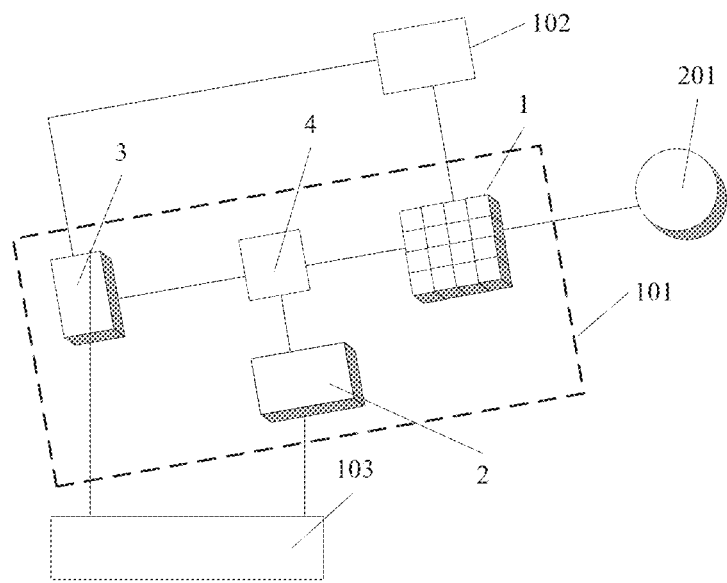
FIG. 5 is a schematic structural diagram of a laser scanner according to embodiments of the present disclosure.

As shown in FIG. 5, the present disclosure provides a liquid crystal phase shifter array 1 including a, plurality of liquid crystal phase shifter units arranged in array. With reference to FIGS. 1, 2 and 3, the liquid crystal phase shifter array 1 further includes a first substrate 11 and a second substrate 12 disposed opposite to each other, a liquid crystal layer 16 provided between the first substrate 11 and the second substrate 12, a first electrode 13 provided on a side of the first substrate 11 proximal to the liquid crystal layer 16, and a second electrode 14 provided on a side of the second substrate 12 proximal to the liquid crystal layer 16. Each liquid crystal phase shifter unit includes a first optical waveguide 151 provided on the side of the first substrate 11 proximal to the liquid crystal layer 16 and arranged to be in direct contact with the liquid crystal layer 16.

By applying different voltages on the first electrode 13 and the second electrode 14, a laser incident on the first optical waveguide 151 is allowed to exit into the liquid crystal layer 16. That is, the first electrode 13 and the second electrode 14 are respectively provided on the first substrate 11 and the second substrate 12 and positioned on two sides of the liquid crystal layer 16, and deflection of liquid crystal molecules in the liquid crystal layer 16 is controlled by controlling a voltage difference between the first electrode 13 and the second electrode 14.

With the liquid crystal phase shifter array of the embodiments of the present disclosure, a laser may be incident on the first optical waveguide 151 in a direction parallel to the first substrate 11, and deflection of the liquid crystal molecules is controlled by controlling the voltage difference between the first electrode 13 and the second electrode 14 so as to change a phase of the laser, so that the laser is allowed to exit from the first optical waveguide 151 to the liquid crystal layer 16. The plurality of liquid crystal phase shifter units are simultaneously used, and lasers transmitted through the liquid crystal phase shifter units arranged in array interfere with each other to cause superposition or cancellation of phases, so as to change outgoing directions of the lasers while leaving the liquid crystal phase shifter array 1. In such a way, an outgoing direction of a laser scanning beam may be adjusted and controlled by controlling voltages, and there will be no mechanical loss and scanning accuracy will be guaranteed during use. The liquid crystal phase shifter array of the embodiments of the present disclosure may be used to replace combination use of a rotating motor and a multifaceted prism in related art, so as to simplify components and an internal structure of a laser scanner and reduce production cost thereof.

Figure 4A:
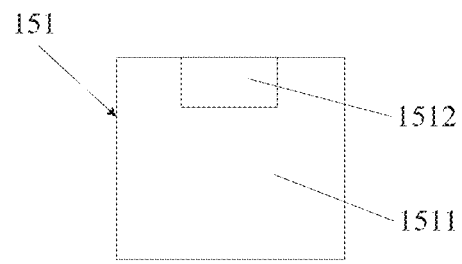
FIG. 4A is a schematic structural diagram of a first optical waveguide according to embodiments of the present disclosure.

With reference to FIGS. 4A and 1, the first optical waveguide 151 includes a first base 1511 and a first waveguide tube 1512 provided on a side of the first base 1511 proximal to the liquid crystal layer 16. The first waveguide tube 1512 has a refractive index n1, and the first base 1511 has a refractive index n2. By applying different voltages on the first electrode 13 and the second electrode 14, a refractive index of the liquid crystal layer 16 is made to reach n3, and it is satisfied that n2<n1<n3.

When a voltage applied on the first electrode 13 is different from that applied on the second electrode 14 and the laser incident on the first optical waveguide 15 is allowed to exit into the liquid crystal layer 16, an electric field is generated between the first electrode 13 and the second electrode 14, and the liquid crystal molecules in the liquid crystal layer 16 are deflected, so as to make the refractive index n1 of the first waveguide tube 1512 smaller than the refractive index n3 of the liquid crystal layer 16. After the laser exits from the first waveguide tube 1512 to enter the liquid crystal layer 16, it is refracted by the liquid crystal molecules in the liquid crystal layer 16 and the second substrate 12 sequentially and then exits. Since the refractive index n2 of the first base 1511 is smaller than the refractive index n1 of the first waveguide tube 1512, the laser may not exit from the first base 1511. By independently controlling the voltages applied on the first electrode 13 and the second electrode 14 corresponding to each liquid crystal phase shifter unit, the refractive index n3 of the liquid crystal molecules is controlled such that phase retardation occurs due to dielectric anisotropy of liquid crystal after the laser passes through the liquid crystal layer 16. After leaving each liquid crystal phase shifter unit, the lasers are subject to superstition and cancellation to cause enhancement of light waves in a certain direction and cancellation of light waves in another direction, so, from a macroscopic point of view, a direction of the light waves is shifted and the outgoing direction of the laser while leaving the liquid crystal phase shifter array is changed.

The liquid crystal layer 16 serves as a cover layer of the first optical waveguide 151, and the liquid crystal molecules therein are controlled by the electric field to change the refractive index of liquid crystal layer 16, so that the laser may be transmitted from the first optical waveguide 151 into the liquid crystal layer 16, and then pass through the liquid crystal layer 16 and the second substrate 12 to exit. The lasers which exit from the plurality of the liquid crystal phase shifter units of the liquid crystal phase shifter array 1 interfere with each other.

When the voltage applied on the first electrode 13 is equal to that applied on the second electrode 14, no electric field is generated between the first electrode 13 and the second electrode 14, so that the liquid crystal molecules in the liquid crystal layer 16 are not deflected. In such case, the refractive index n3 of the liquid crystal layer 16 is reduced to satisfy n3<n1. Similarly, since the refractive index n2 of the first base 1511 is smaller than the refractive index n1 of the first waveguide tube 1512, the laser may not exit from the first base 1511. Therefore, the laser is totally reflected in the first optical waveguide 151, that is, the laser is confined to propagate within the first optical waveguide 151 and may not exit into the liquid crystal layer 16.

Furthermore, as shown in FIGS. 2 and 3, the liquid crystal phase shifter array 1 may further include a second optical waveguide 152 for transmitting lasers. The second optical waveguide 152 is provided on the side of the first substrate 11 proximal to the liquid crystal layer 16, and is coupled to the first optical waveguide 151 of an adjacent liquid crystal phase shifter unit.

Figure 4B:
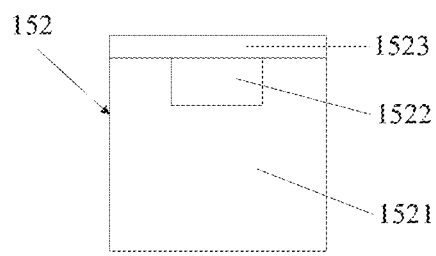
FIG. 4B is a schematic structural diagram of a second optical waveguide according to embodiments of the present disclosure.

As shown in FIG. 4B, the second optical waveguide 152 includes a second base 1521, a second waveguide tube 1522 and a shielding film 1523. The second waveguide tube 1522 is provided on a side of the second base 1521 proximal to the liquid crystal layer 16, and is communicated with the first waveguide tube 1512 of the first optical waveguide 151 coupled to the second optical waveguide 152. The shielding film 1523 is provided on a side of the second waveguide tube 1522 proximal to the liquid crystal layer 16, and covers at least the second waveguide tube 1522. In an embodiment of the present disclosure, the shielding film 1523 covers the second base 1521 and the second waveguide tube 1522. The second waveguide tube 1522 has a refractive index n4, the shielding film 1523 has a refractive index n5, the second base 1521 has a refractive index n6, and it is satisfied that n5<n4 and n6<n4. In such case, the laser may never be incident on the shielding film 1523 and the second base 1521 from the second waveguide tube 1522, so as to ensure that the laser propagates within the second optical waveguide 152.

According to the embodiments of the present disclosure, a material of the second waveguide tube 1522 may be the same as that of the first waveguide tube 1512, that is, n4=n1, for example, the material may be quartz tubes. According to the embodiments of the present disclosure, a material of the first base 1511 may be the same as that of the second base 1521, that is, n6=n2, for example, the material may be silicone substrates. So, the first optical waveguide 151 and the second optical waveguide 152 may be formed by a same forming process.

It should be noted that the first electrode 13 and the second electrode 14 may produce a vertical electric field which is applied for the reason that the liquid crystal of in the liquid crystal phase shifter array 1 is nematic liquid crystal. Different from display liquid crystal, the nematic liquid crystal has a photoelectric property more similar to that of twisted nematic (TN) liquid crystal which liquid crystal is deflected along a long axis, and therefore a vertical electric field should be applied.

As shown in FIGS. 1 and 2, the first electrode 13 and the second electrode 14 are stripe-shaped electrodes, and are arranged in directions perpendicular to each other, so that the first electrode 13 and the second electrode 14 form a grid to ensure control of the liquid crystal molecules in each position of the liquid crystal phase shifter array 1.

In the embodiments of the present disclosure, the second electrode 14 may be a common electrode and be grounded (that is, a zero voltage is applied on the second electrode 14), and an alternating voltage is applied on the first electrode 13, so as to control reversal of the liquid crystal molecules and prevent polarization of liquid crystal. The first optical waveguide 151 is located in a middle position of the liquid crystal phase shifter unit and between two adjacent first electrodes 13.

The liquid crystal molecules in the liquid crystal layer 16 should be aligned, so as to possess a certain initial state for facilitate subsequent control of a deflection angle of the liquid crystal molecules. As shown in FIG. 1, the liquid crystal phase shifter array 1 may further include a first alignment layer 19 conformally formed on an upper surface and side surfaces of the first electrode 13 and an upper surface of the first substrate 11, and a second alignment layer 10 conformally formed on a lower surface and side surfaces of the second electrode 14 and a lower surface of the second substrate 12. That is, the first alignment layer 19 is closer to the liquid crystal layer 16 than the first electrode 13 is, and the second alignment layer 10 is closer to the liquid crystal layer 16 than the second electrode 14 is, which facilitates alignment of the liquid crystal molecules.

Furthermore, as shown in FIG. 1, the liquid crystal phase shifter array 1 further includes spacers 17 provided between the first substrate 11 and the second substrate 12 and configured to support the first substrate 11 and the second substrate 12. It should be noted that the spacers 17 may be located at edges of the first substrate 11 and the second substrate 12, or in middle positions of the liquid crystal phase shifter array 1, that is, between adjacent liquid crystal phase shifter units for improve the support.

It should be noted that a thickness of the liquid crystal layer 16 in the liquid crystal phase shifter array 1 is much larger than that of a liquid crystal layer of a common liquid crystal display panel, so, if column spacers are used or only sealant is used for supporting a liquid crystal cell, the first substrate 11 and the second substrate 12 will curve inwards while filling the liquid crystal cell with liquid crystal, which may probably cause damage to the first alignment layer 19 and the second alignment layer 10. Therefore, spherical spacers are used as the spacers 17 in the embodiments of the present disclosure.

Furthermore, as shown in FIG. 1, the liquid crystal phase shifter array 1 further includes sealant 18 provided at peripheral regions thereof, that is, along edges of the first substrate 11 and the second substrate 12. The sealant 18 has two ends coupled to the first substrate 11 and the second substrate 12 respectively and is configured to seal a space therebetween.

Figure 6:
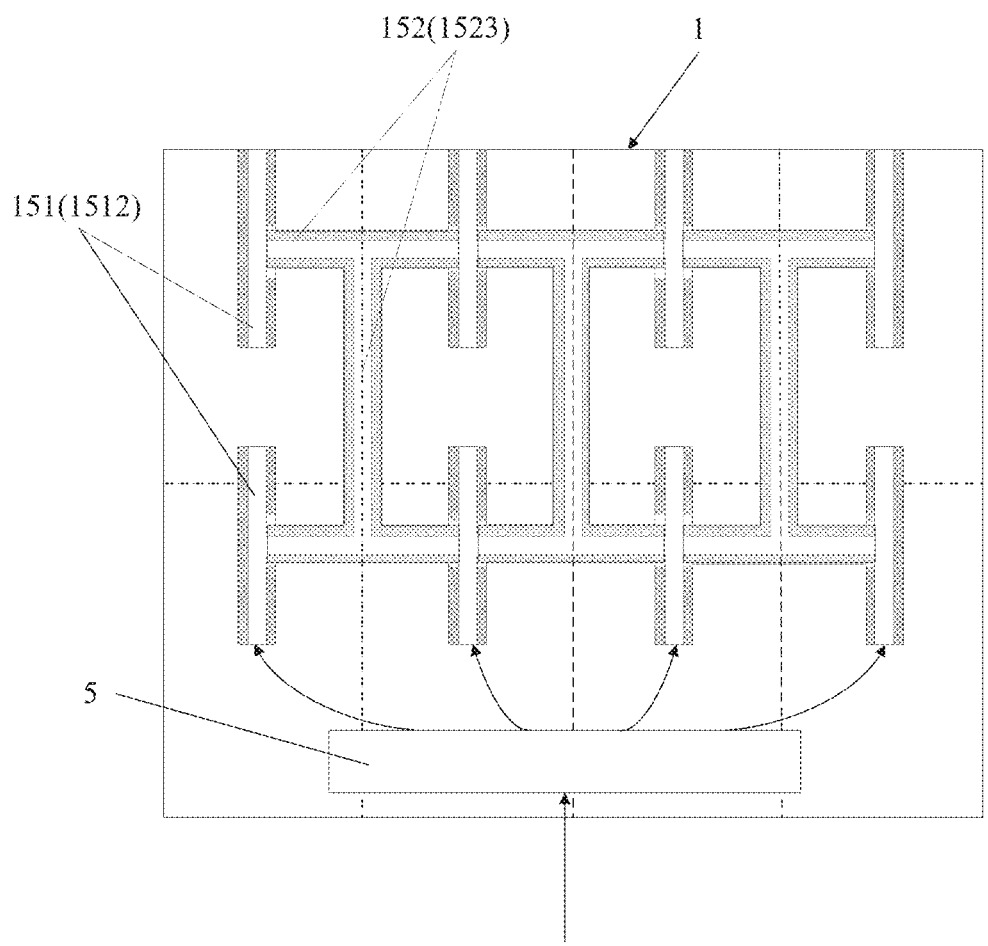
FIG. 6 is a schematic diagram of splitting a laser beam by a directional coupler according to embodiments of the present disclosure.

Furthermore, as shown in FIG. 6, the liquid crystal phase shifter array 1 may further include a directional coupler 5 provided on the first substrate 11 and configured to split a, laser into a plurality of laser beams, make each laser beam to be incident on the first optical waveguide 151 of each liquid crystal phase shifter unit arranged corresponding to the directional coupler 5. The directional coupler 5 may be welded or bonded to the first substrate 11 of the liquid crystal phase shifter array 1.

As shown in FIG. 2, the liquid crystal phase shifter array 1 has m*n liquid crystal phase shifter units, wherein m represents the number of each row of liquid crystal phase shifter units in the liquid crystal phase shifter array 1, n represents the number of each column of liquid crystal phase shifter units in the liquid crystal phase shifter array 1, and both m and n are integers greater than 2.

According to the embodiments of the present disclosure, the number m of each row of liquid crystal phase shifter units is equal to the number n of each column of liquid crystal phase shifter units in the liquid crystal phase shifter array 1. In such a way, the liquid crystal phase shifter array 1 achieves identical laser interference in all directions, which facilitates controlling and adjusting the outgoing direction of the laser beam.

According to the embodiments of the present disclosure, both m and n have a range of 2-64.

The liquid crystal phase shifter array 1 may be formed by performing a coating process on a large glass substrate (that is, the first substrate 11). A cell is firstly formed with the sealant 18 and is provided with a small opening for filling liquid crystal, then the liquid crystal is filled under vacuum, and finally the opening is sealed with the sealant 18 so as to guarantee tightness of the cell.

The present disclosure further provides a laser scanner, as shown in FIG. 5, including a scanning head 101 having a laser emitter 2 for emitting a first laser and the liquid crystal phase shifter array 1 of each of the aforesaid embodiments.

The liquid crystal phase shifter array 1 is configured to receive the first laser emitted from the laser emitter 2, and make the first laser to transmit through the first optical waveguides 151 of the respective liquid crystal phase shifter units and interfere with each other, so as to change a direction of the first laser and enable the first laser to be incident on an object to be scanned 201. The liquid crystal phase shifter array 1 is configured to further receive a second laser reflected back from the object to be scanned 201, make the second laser to transmit through the first optical waveguides 151 of the respective liquid crystal phase shifter units and interfere with each other, so as to change a direction of the second laser. The first laser is reflected by the object to be scanned 201 to form the second laser which carries information about the object to be scanned 201.

With the laser scanner of the embodiments of the present disclosure, a laser may be incident on the first optical waveguide 151 in a direction parallel to the first substrate 11, and deflection of the liquid crystal molecules is controlled by controlling a voltage difference between the first electrode 13 and the second electrode 14 so as to change a phase of the laser, so that the laser is allowed to exit from the first optical waveguide 151 to the liquid crystal layer 16. The plurality of liquid crystal phase shifter units are simultaneously used, and lasers transmitted through the liquid crystal phase shifter units arranged in array interfere with each other to cause superposition or cancellation of phases, so as to change outgoing directions of the lasers while leaving the liquid crystal phase shifter array 1. In such a way, an outgoing direction of a laser scanning beam may be adjusted and controlled by controlling voltages, and there will be no mechanical loss and scanning accuracy will be guaranteed during use.

With reference to FIGS. 1, 2 and 5, the laser scanner of the embodiments of the present disclosure further includes a control module 102, and the scanning head 101 further includes a data receiver 3.

The data receiver 3 is configured to receive the second laser which exits from the liquid crystal phase shifter array 1, and the control module 102 is configured to supply voltages to the first electrode 13 and the second electrode 14 of the liquid crystal phase shifter array 1, and determine an image of the object to be scanned 201 according to the information carried by the second laser received by the data receiver 3.

The first laser emitted from the laser emitter 2 in the scanning head 101 is incident on the liquid crystal phase shifter array 1, the control module 102 controls deflection angles of liquid crystal molecules in each liquid crystal phase shifter unit by supplying voltages to the liquid crystal phase shifter array 1, so as to control an outgoing direction of the first laser after being transmitted through the first optical waveguide 151 of each liquid crystal phase shifter unit, and further control an outgoing direction of the first laser after being subject to interference through each liquid crystal phase shifter unit to deflect the first laser in different directions, thereby scanning the object to be scanned 201. The object to be scanned 201 may reflect the first laser back to the liquid crystal phase shifter array 1. Such laser reflected back to the liquid crystal phase shifter array 1 is the second laser which carries information of shape, color, size and density of the object to be scanned 201. After being transmitted through the first optical waveguide 151 of each liquid crystal phase shifter unit, the second laser interferes with each other to change the outgoing direction thereof, and then is incident on the data receiver 3. The control module 102 obtains the image of the object to be scanned 201 according to the information carried by the second laser received by the data receiver 3, so that laser scanning of the object to be scanned 201 is achieved.

It should be noted that the image of the object to be scanned 201 may be determined by the control unit 102 according to the information carried by the second laser by using various known methods, which will not be described in detail herein.

Given that there is no certain relative position relation between the object to be scanned 201 and the scanning head 101, and there are differences in relative position relations between components in the scanning head 101, in order to ensure that the second laser reflected back from the object to be scanned 201 may be successfully incident on the data receiver 3, the scanning head 101 may further include an optical path changer 4 as shown in FIG. 5. The optical path changer 4 is provided between the laser emitter 2 and the liquid crystal phase shifter array 1 and between the liquid crystal phase shifter array 1 and the data receiver 3, and is configured to receive the first laser emitted from the laser emitter 2 and change the direction of the first laser so as to make the first laser to be incident on the liquid crystal phase shifter array 1, and receive the second laser which exits from the liquid crystal phase shifter array 1 and change the direction of the second laser so as to make the second laser to be incident on the data receiver 3.

The optical path changer 4 may be a planar reflective structure, such as a mirror, and have a form capable of being changed under the control of the control module 102 and also have a form of being manually adjusted.

As shown in FIG. 6, the directional coupler 5 makes each beam of the first laser to be incident on the first waveguide tube 1512 of each liquid crystal phase shifter unit provided corresponding to the directional coupler 5. It should be noted that in the case that the scanning head 101 includes the optical path changer 4, the optical path changer 4 changes the direction of the first laser, and makes the first laser to be incident on the directional coupler 5, and the directional coupler 5 splits the first laser into a plurality of beams, makes each beam of the first laser to be incident on the first optical waveguide 151 (that is, the first waveguide tube 1512) of each liquid crystal phase shifter unit provided corresponding to the directional coupler 5.

As shown in FIG. 5, the laser scanner may further include a distance measuring module 103 which calculates a distance between the object to be scanned 201 and the laser scanner according to a phase and emission time of the first laser emitted by the laser emitter 2 and a phase and receiving time of the second laser received by the data receiver 3. Therefore, the laser scanner of the embodiments of the present disclosure may be widely applied in the fields of railways, automobile manufacturing, precision mechanical parts and electronic component detection.

It should be noted that the distance measuring module 103 and the control module 102 may be disposed in a main structure of the laser scanner, and the laser emitter 2 and the data receiver 3 may not be disposed in the scanning head 101 and may be disposed in the main structure of the laser scanner instead. Laser ranging may be realized by using various known methods, which will not be described in detail herein.

It should be understood that the foregoing implementations are merely exemplary implementations adopted for describing the principle of the present disclosure, but the present disclosure is not limited thereto. Those of ordinary skill in the art may make various variations and improvements without departing from the spirit and essence of the present disclosure, and these variations and improvements shall be considered to fall into the protection scope of the present disclosure.

What is claimed is:

1. A liquid crystal phase shifter array, comprising:
   a plurality of liquid crystal phase shifter units arranged in array; and
   a first substrate and a second substrate disposed opposite to each other;
   wherein each of the plurality of liquid crystal phase shifter units comprises:
      a liquid crystal layer provided between the first substrate and the second substrate;
      a first electrode provided on a side of the first substrate proximal to the liquid crystal layer;
      a second electrode provided on a side of the second substrate proximal to the liquid crystal layer; and
      a first optical waveguide provided on the side of the first substrate proximal to the liquid crystal layer and arranged to be in direct contact with the liquid crystal layer; and
   wherein the liquid crystal phase shifter array further comprises a plurality of second optical waveguides, each of the plurality of second optical waveguides being provided at a side of the first substrate proximal to the liquid crystal layer, and coupled to first optical waveguides included in two corresponding adjacent liquid crystal phase shifter units of the plurality of liquid crystal phase shifter units.

2. The liquid crystal phase shifter array of claim 1, wherein the first optical waveguide comprises a first base, and a first waveguide tube provided on a side of the first base proximal to the liquid crystal layer, and
   wherein the first waveguide tube has a refractive index $n1$, and the first base has a refractive index $n2$.

3. The liquid crystal phase shifter array of claim 1, further comprising:
   a directional coupler provided on the first substrate and configured to split a laser light incident on the directional coupler into a plurality of laser beams, and make each laser beam to be incident on the first optical waveguide of each liquid crystal phase shifter unit arranged corresponding to the directional coupler.

4. The liquid crystal phase shifter array of claim 1, wherein the second optical waveguide comprises a second base, a second waveguide tube and a shielding film,
   the second waveguide tube is provided on a side of the second base proximal to the liquid crystal layer, and communicated with the first waveguide tube of the first optical waveguide coupled to the second optical waveguide, and
   the shielding film being provided on a side of the second waveguide tube proximal to the liquid crystal layer, and configured to cover at least the second waveguide tube,
   wherein the second waveguide tube has a refractive index $n4$, the shielding film has a refractive index $n5$, the second base has a refractive index $n6$, and it is satisfied that $n5<n4$ and $n6<n4$.

5. The liquid crystal phase shifter array of claim 4, wherein, $n4=n1$ and $n6=n2$.

6. The liquid crystal phase shifter array of claim 5, wherein the first waveguide tube and the second waveguide tube include quartz, and/or,
the first base and the second base include silicone.

7. The liquid crystal phase shifter array of claim 1, wherein the first electrode and the second electrode are stripe-shaped electrodes, and arranged in directions perpendicular to each other.

8. The liquid crystal phase shifter array of claim 1, further comprising:
spacers provided between the first substrate and the second substrate.

9. The liquid crystal phase shifter array of claim 8, further comprising:
sealant provided at peripheral regions of the liquid crystal phase shifter array and configured to seal a space between the first substrate and the second substrate.

10. The liquid crystal phase shifter array of claim 1, further comprising:
a first alignment layer conformally formed on an upper surface and side surfaces of the first electrode and an upper surface of the first substrate; and
a second alignment layer conformally formed on a lower surface and side surfaces of the second electrode and a lower surface of the second substrate.

11. A laser scanner, comprising a scanning head which comprises:
the liquid crystal phase shifter array of claim 1; and
a laser emitter for emitting a first laser light,
wherein the liquid crystal phase shifter array is configured to receive the first laser light emitted from the laser emitter, to make the first laser light to transmit through first optical waveguides of respective liquid crystal phase shifter units, and to make laser lights exited from the respective liquid crystal phase shifter units to interfere with each other, so as to change a direction of the first laser light and enable the changed first laser light to be incident on an object to be scanned, and
the liquid crystal phase shifter array is configured to further receive a second laser light reflected back from the object to be scanned, to make the second laser light to transmit through first optical waveguides of respective liquid crystal phase shifter units, and laser lights exited from the respective liquid crystal phase shifter units to interfere with each other, so as to change a direction of the second laser light,
wherein the changed first laser light is reflected by the object to be scanned to form the second laser light which carries information of the object to be scanned.

12. The laser scanner of claim 11, further comprising a control module, and the scanning head further comprising a data receiver, wherein,
the data receiver is configured to receive the changed second laser light which exits from the liquid crystal phase shifter array, and
the control module is configured to supply voltages to the first electrode and the second electrode of the liquid crystal phase shifter array, and determine an image of the object to be scanned according to the information carried by the changed second laser light received by the data receiver.

13. The laser scanner of claim 12, wherein the scanning head further comprises an optical path changer provided between the laser emitter and the liquid crystal phase shifter array and between the liquid crystal phase shifter array and the data receiver, and configured to
receive the first laser light emitted from the laser emitter and change the direction of the first laser so as to make the first laser light to be incident on the liquid crystal phase shifter array, and
receive the changed second laser light which exits from the liquid crystal phase shifter array and change the direction of the changed second laser light so as to make the changed second laser light to be incident on the data receiver.

14. The laser scanner of claim 11, further comprising:
a distance measuring module configured to calculate a distance between the object to be scanned and the laser scanner according to a phase and emission time of the first laser light emitted by the laser emitter and a phase and receiving time of the changed second laser light received by the data receiver.

15. A driving method of a liquid crystal phase shifter array, the liquid crystal phase shifter array comprising:
a plurality of liquid crystal phase shifter units arranged in array;
a first substrate and a second substrate disposed opposite to each other;
wherein each of the plurality of liquid crystal phase shifter units comprises:
a liquid crystal layer provided between the first substrate and the second substrate;
a first electrode provided on a side of the first substrate proximal to the liquid crystal layer;
a second electrode provided on a side of the second substrate proximal to the liquid crystal layer; and
a first optical waveguide provided on the side of the first substrate proximal to the liquid crystal layer and arranged to be in direct contact with the liquid crystal layer,
wherein the liquid crystal phase shifter array further comprises a plurality of second optical waveguides, each of the plurality of second optical waveguides being provided at a side of the first substrate proximal to the liquid crystal layer, and coupled to first optical waveguides included in two corresponding adjacent liquid crystal phase shifter units of the plurality of liquid crystal phase shifter units; and
the driving method comprising:
applying different voltages on the first electrode and the second electrode, so as to make a laser light incident on the first optical waveguide to exit into the liquid crystal layer.

16. The driving method of claim 15, wherein the first optical waveguide comprises a first base, and a first waveguide tube provided on a side of the first base proximal to the liquid crystal layer,
the first waveguide tube has a refractive index n1, the first base has a refractive index n2, the liquid crystal layer has a refractive index n3, and
the driving method comprising:
applying different voltages on the first electrode and the second electrode, so as to satisfy n2<n1<n3.

* * * * *